UNITED STATES PATENT OFFICE.

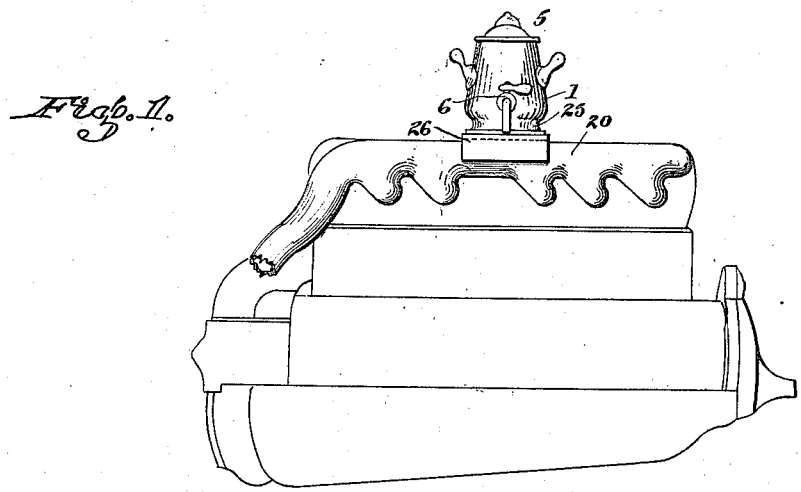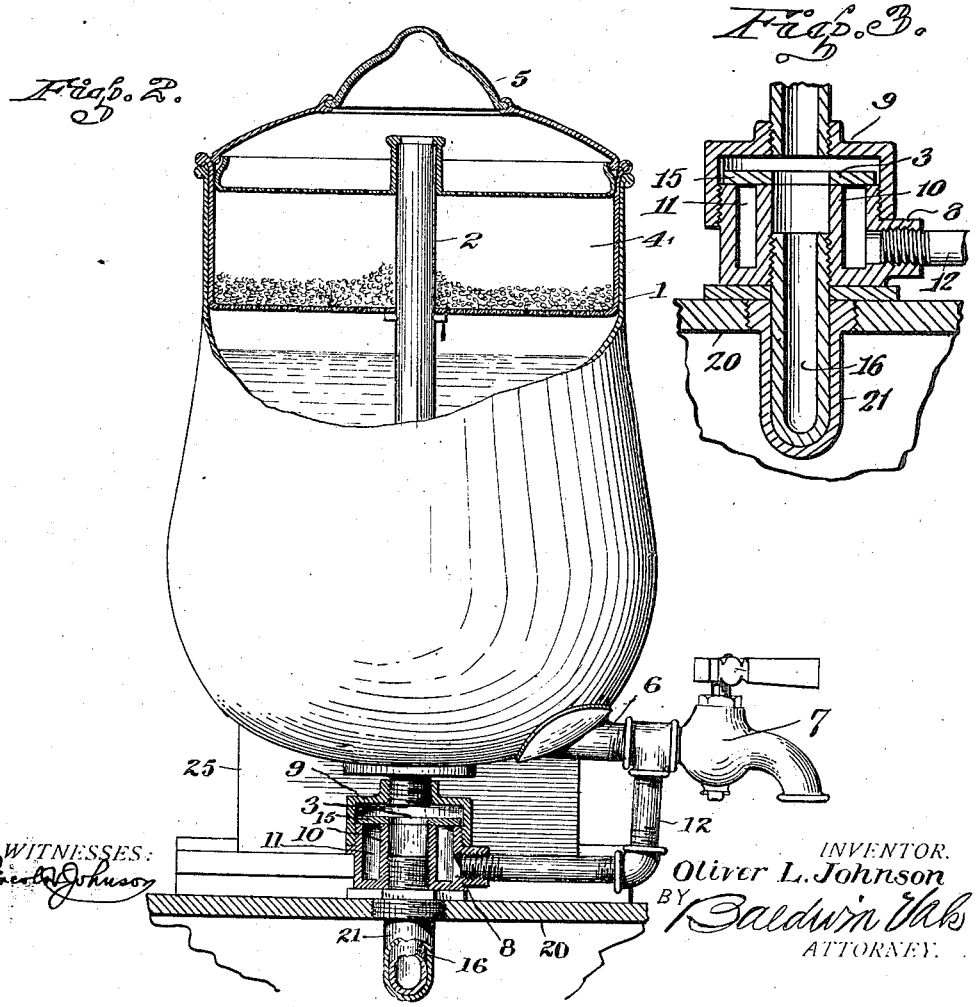

OLIVER L. JOHNSON, OF SAN FRANCISCO, CALIFORNIA.

PERCOLATOR.

1,296,086.  Specification of Letters Patent.  Patented Mar. 4, 1919.

Application filed May 9, 1917. Serial No. 167,425.

*To all whom it may concern:*

Be it known that I, OLIVER L. JOHNSON, a citizen of the United States, and a resident of the city and county of San Francisco and State of California, have made a new and useful Invention—to wit, Percolator; and I hereby declare the following to be a full, clear, concise, and exact description of the same.

This invention is a percolator constructed and arranged to be mounted upon the exhaust manifold of an automobile engine so as to receive heat for its operation from the exhaust gases of the engine.

The invention is illustrated in the accompanying drawing forming part of this specification and the appended claim in which Figure 1 is a view illustrating the application of the invention. Fig. 2 is a side view of the invention partially in cross section. Fig. 3 is a sectional view of the socket and heating element.

In said drawing, 1 indicates the body of the percolator constructed in accordance with my invention. A tube 2 extends vertically and centrally through the percolator body to the top thereof, which tube is open at its upper end and connects at its lower end to a percolator valve 3. A coffee receptacle 4 fits in the top of the percolator body 1 over the upper portion of the tube 2. A glass top 5 is frictionally held in the top of the percolator body for inclosing the top thereof when the percolator is in operation. An outlet tube 6 leads from the bottom of the percolator body and a faucet 7 is connected to the outer end of said tube for drawing coffee from the percolator body. The percolator valve 3 is formed in two parts, a lower part 8 and an upper part 9, which screws onto the lower part. The percolator tube 2 screws into the upper valve part 9. The lower part 8 of the valve is formed with a central tubular portion 10 which alines with the lower end of the tube 2, said tubular portion providing an annular chamber 11 open at the top. A tube 12 connects the outlet pipe 6 to the valve chamber 11. The top of the walls of the valve chamber form a seat for a gravity valve member 15, which normally rests upon its seat and closes the top of the chamber, shutting off communication between said chamber and the tubular portion 10 and the lower end of tube 2. A tubular water heating receptacle 16 screws into the lower end of the tubular valve portion 10.

An exhaust manifold of an automobile engine is designated 20 in the upper wall of which is secured a socket 21, its lower part extending into the interior of the manifold, which socket is adapted to receive the heating receptacle 16. Legs 25 are provided on the percolator body which rest on a support 26 on the automobile and support the percolator.

In operation the water from the percolator body passes through tubes 6 and 12 into the valve chamber 11, raises valve 15 and then passes into tubular portion 10, receptacle 16 and tube 2. The water in the receptacle is heated by the contact of the heated gas in the exhaust manifold with the socket 21, and is thereby generated into steam, the expansion of which forces the water up the tube 2 and out of the top thereof against the top 5 through the coffee in the coffee receptacle 4 and into the body of the percolator, forming liquid coffee in said body, which may be drawn out through the faucet 7.

The receptacle 16 may be removed from the socket 21 and the percolator removed when not desired for use.

Having described my invention, I claim as new and desire to secure by Letters Patent:

In combination with the exhaust manifold of an automobile engine, a socket in said manifold, a percolator, a receptacle adapted to fit in said socket and means for conducting water from the body of said percolator to said receptacle to be heated and generated into steam, and a percolator tube leading from said receptacle to the coffee receptacle in the top of said percolator.

In testimony whereof, I have hereunto set my hand at San Francisco, California, this 2nd day of May 1917.

OLIVER L. JOHNSON.

In presence of—
 ALAN FRANKLIN,
 LINCOLN JOHNSON.

Copies of this patent may be obtained for five cents each, by addressing the "Commissioner of Patents, Washington, D. C."